UNITED STATES PATENT OFFICE.

SAMUEL LA FORGE, OF CLEVELAND, OHIO.

IMPROVEMENT IN WATER-PROOF LEATHER GOODS.

Specification forming part of Letters Patent No. 27,337, dated February 28, 1860; Reissue No. 961, dated May 15, 1860.

*To all whom it may concern:*

Be it known that I, SAMUEL LA FORGE, of the city of Cleveland, in the State of Ohio, have invented a new and useful article of manufacture denominated "India-Rubber Leather;" and I do hereby declare that the following is a full, clear, and exact description of the same.

My invention consists in producing from the skins of various animals which are now used for making "upper-leather," and a solution or compound of india-rubber or gutta-percha charged with sulphur, an article of manufacture which may with propriety be called "india-rubber leather."

I have carried out my invention in the following manner, although, as is evident, the manner may be varied without departing from the nature and character of my invention.

I take any skin of an animal from which upper-leather is usually made after it has gone through the tanning process, but previous to its being put through the dressing process, and after having exposed it to a sufficient degree of heat to drive off its fluid particles I coat it with a solution or compound of india-rubber or gutta-percha charged with sulphur, and then subject the skin thus coated to the usual vulcanizing process. By the means and in the manner here named I have produced a pliable, soft, and perfectly water-impervious article, glossy and in every respect equal to japanned leather and without its liability to crack, susceptible of being used in the manufacture of boots, shoes, and all other articles of form or shape, as also in the making of every kind of article usually made of leather or of india-rubber, or of india-rubber or gutta-percha fabrics.

I am aware that the vulcanized solutions of rubber have been applied to leather, cloth, and other fabrics, and that the upper part of a shoe has been formed of "leather dressed without oil," and the vulcanized solution applied to it; but, as is evident from a comparison of the articles produced by either of these plans and the articles produced by me, my invention is entirely distinct from those here named.

What I claim, then, as my invention, and desire to secure by Letters Patent, is—

The article of manufacture herein named, prepared from the undressed skin, exposed to heat, coated with the charged rubber solution or compound, and then subjected to the vulcanizing process, as herein set forth.

SAML. LA FORGE.

Witnesses:
T. T. EVERETT,
F. S. MYER.